United States Patent [19]

Coates

[11] Patent Number: 4,816,919
[45] Date of Patent: Mar. 28, 1989

[54] AUTOMATIC FOCUSSING SYSTEM FOR AN OPTICAL SYSTEM

[75] Inventor: Philip V. Coates, Sunbury-on-Thames, United Kingdom

[73] Assignee: EMI Limited, Hayes, England

[21] Appl. No.: 329,528

[22] Filed: Dec. 3, 1981

[30] Foreign Application Priority Data

Dec. 10, 1980 [GB] United Kingdom ............... 8039144

[51] Int. Cl.⁴ ..................... H04N 5/232; H04N 3/14
[52] U.S. Cl. ............................ 358/227; 358/213.13
[58] Field of Search ............. 358/113, 166, 167, 213, 358/227, 213.13; 250/201, 204, 201 AF

[56] References Cited

U.S. PATENT DOCUMENTS 3,983,320 9/1976 Ketchum et al. .
4,133,606 1/1979 Hosoe et al. .
4,193,093 3/1980 St. Clair .
4,250,521 2/1981 Wright .

FOREIGN PATENT DOCUMENTS 1393532 5/1975 United Kingdom .
2047037 11/1980 United Kingdom .
2061660 5/1981 United Kingdom .

Primary Examiner—Stephen C. Buczinski
Attorney, Agent, or Firm—Fleit, Jacobson, Cohn & Price

[57] ABSTRACT

A focussing system in which a detection and processing device (2) scans the image plane, in raster fashion, to generate a video signal representing the intensity of radiation prevailing at successively scanned locations. A selection circuit (6) contains a programmable memory which generates addresses suitable for selecting discrete sets (S) of neighbouring locations and a circuit (7) is responsive to the addresses to access to a processing circuit (8) only those portions of the video signal which correspond to the sets (S) of locations. The processing circuit (8) generates difference signals representing differences of intensity between neighbouring locations and evaluates the number ($P_{tm}$) of difference signals exceeding each of a number of preset threshold values ($t_m$) to generate a histogram. The numbers constituting the histogram are then weighted and scanned to generate a control signal (F) representing the focus.

9 Claims, 6 Drawing Sheets

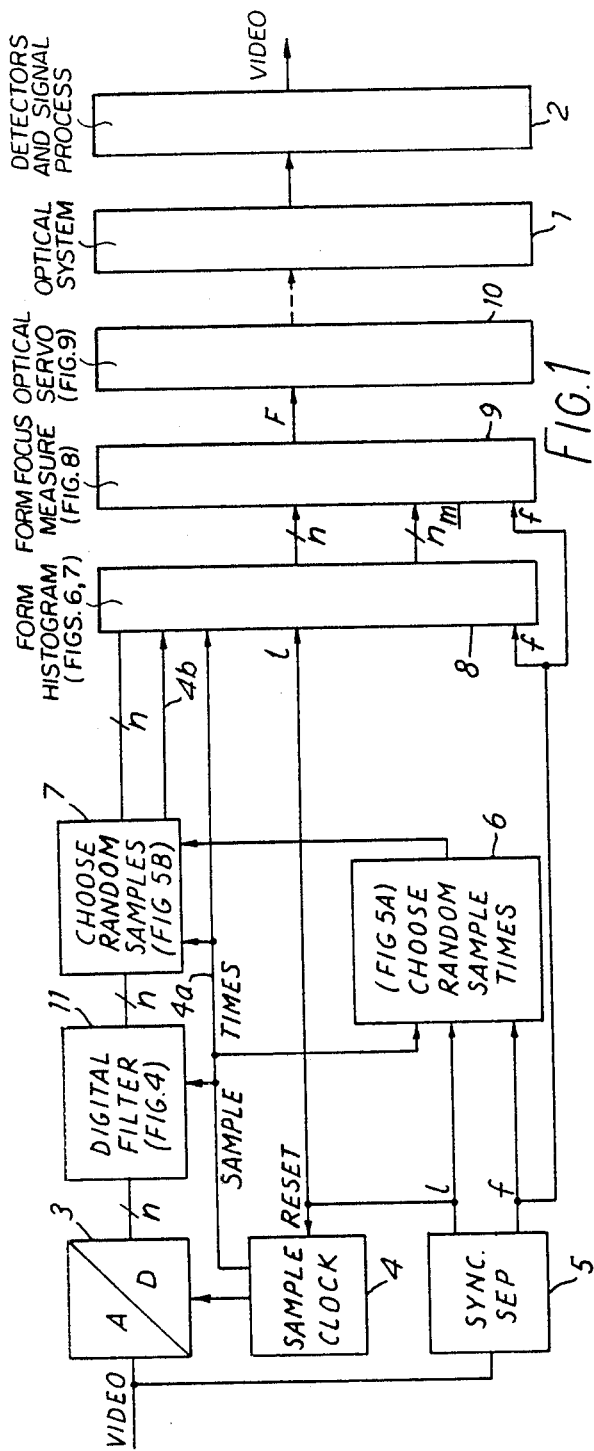

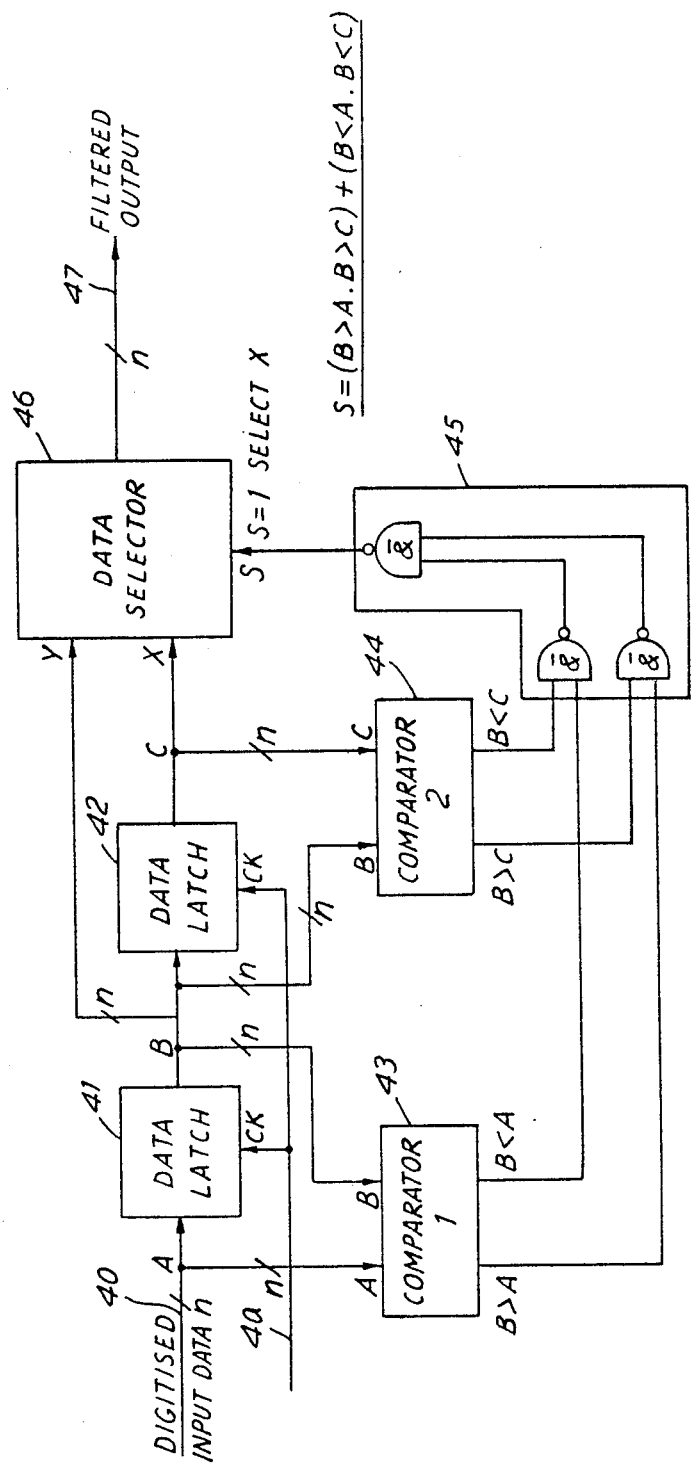
FIG. 4 BLOCK DIAGRAM OF DIGITAL NOISE FILTER

AUTOMATIC FOCUSSING SYSTEM FOR AN OPTICAL SYSTEM

The present invention relates to an automatic focussing system for an optical system.

It is known to provide automatic focussing for a hand-held photographic camera using an ultrasonic range finder. It is also known to provide automatic focussing for a hand-held photographic camera by viewing a scene in a stereo-scopic manner from two slightly spaced apart positions at which reflectors are placed. The reflectors reflect the two views of the scene onto a correlator. One of the reflectors is rotatable and is automatically rotated until the correlator determines that the two views coincide. The optical system is coupled to the rotatable reflector to effect the focussing.

An object of the present invention is to provide an automatic focussing arrangement in which a measure of focus is derived from the information content of an image of the scene itself.

According to the invention there is provided a focussing system comprising:

detector means capable of generating an electrical signal representing intensity of electromagnetic radiation prevailing in the image plane of said system, a processing means for deriving from said electrical signal further electrical signals representing differences of intensity between respective neighbouring locations in the image plane, further processing means comprising means capable of evaluating the number of said further electrical signals representing differences of intensity exceeding each of a plurality of different, fixed threshold values, and means for weighting each said number by a respective amount and for summing the weighted numbers thereby to generate a control signal representing the focus of the image, and drive means, responsive to said control signal, to vary the focus of said optical system.

For a better understanding of the present invention and to show how the same may be carried into effect, reference will now be made, by way of example, to the accompanying drawings, in which:

FIG. 1 is a schematic block diagram of an automatically focussed optical system in accordance with the invention, FIGS. 2 and 3 are diagrams explaining the operation of the system of FIG. 1, FIG. 4 is a schematic block diagram of a digital filter used in the system, FIG. 5A is a schematic block diagram of a circuit for choosing random sample times, FIG. 5B is a schematic block diagram of a circuit for choosing random samples, FIG. 6 is a schematic block diagram of a circuit for forming the modulus of the difference between successive samples, FIG. 7 is a schematic block diagram of a circuit for forming a histogram of the differences, FIG. 8 is a schematic block diagram of a circuit for forming a measure of focus, and FIG. 9 is a schematic block diagram of a servo mechanism for varying ther focus of the optical system.

In the Figures a line with an oblique through it adjacent a letter n, p or q indicates n p or q parallel conductors for an n, p or q bit digital word, the bits being in parallel.

SUMMARY OF THE ILLUSTRATIVE SYSTEM SHOWN IN FIG. 1

As the focus of an image of a scene moves away from optimum, the high spatial frequencies in the image are progressively reduced and the information content in the image is progressively reduced. In the limit a badly focused image will tend to a uniform intensity.

The present invention uses the number of edges in a scene as a measure of the high frequency content of the scene. In the examples of the invention described hereinafter an edge value is defined as the modulus of the difference between adjacent samples of an image of the scene.

In the system of FIG. 1, an optical system 1 produces an optical image of a scene and the image is scanned by a detection and processing device 2 including light-sensitive detectors whose outputs are processed by signal processors to produce a video signal of, for example, standard 625 line TV format.

The video signal is fed to an analogue to digital converter 3 to produce n bit samples of the video signal, where n, in this example is six.

A sampling clock 4 feeds clock pulses to the converter 3, the clock 4 being kept in synchronism with the video signal by line pulses fed to it by a sync. separator 5, which receives the video signal. The clock 4 also produces on a line 4a clock pulses synchronous with the samples.

Instead of forming edge values for every pair of samples in the image, the edge values are formed for sets of samples having random positions in the image, thus reducing the amount of circuitry required. Referring to FIG. 2 a scene comprises most information of interest in the central third B of its field of view, the top third A being for instance sky or other background and the bottom third C foreground. Thus, in this example the sets of samples S are taken at random from the central third B only. For this purpose the clock pulses are fed together with line and field pulses from the sync. separator 5, to a circuit 6 which chooses random times (synchronous with the clock pulses) within the respective TV lines for selecting the sets of the samples, one set being chosen per TV line. The circuit 6 in turn controls a circuit 7 which allows the chosen sets to pass to a circuit 8 for forming a histogram of edge values.

Referring to FIG. 3, the histogram which is formed is a histogram of the number of edge values exceeding thresholds $t_m$. Thus the vertical bar 30 associated with the highest threshold represents a small number of edge values, whilst the bar 31 associated with the threshold zero represents all the edge values.

As shown in FIG. 3, the shape of the histogram varies with focus, because as focus deteriorates, the image tends to a more uniform intensity. Line D represents the shape of the histogram for optimum focus, line E for moderate focus, and line F for bad focus.

The edge values associated with the highest thresholds are most sensitive to the degree of focus, especially where the focus changes are small. Thus, as shown in FIG. 3B, the highest value part of the histogram is chosen, and a measure F of focus derived therefrom.

Referring to FIG. 3B, if the high value thresholds are to to $t_m$, the better the focus, the more edges there will be of value greater than to.

Thus a measure of focus F is chosen as, for example, $$F = \sum_{m=0}^{m} P_{tm}K^m$$

where
m = an integer
$P_{tm}$ = number of edge values located above threshold tm
K = an integer This measure gives greater weight to edges associated with high threshold.

This measure F of focus is determined in a circuit 9 and fed as an analogue value to a servo-mechanism 10 which controls the focus of the optical system 1.

Whilst F is a measure of the degree of focus it does not indicate the direction in which the focus must be moved to be optimmised. Thus the focus is continually perturbed by an amount which is not appreciable to the eye but which is measurable by F. The perturbation is slow relative to rate of change of the focus due to external disturbances e.g. change in temperature The servo compares the current value of F with a previous value and adds the error to the perturbation to either reinforce or oppose it.

In practice, noise will affect the system and it has been found that Gaussian noise does not substantially affect the focus, but that noise spikes have a marked effect on focus even when only a small percentage of the samples of the image are corrupted. Thus a digital filter 11 is provided to remove the spikes before the focus measure F is obtained.

A noise spike is characterised by a sample which is significantly larger or smaller than its neighbouring samples. The filter detects such a sample and replaces it by the value of a neighbouring sample.

DETAILED DESCRIPTION OF THE CIRCUITS OF THE SYSTEM OF FIG. 1

Figure 5A:
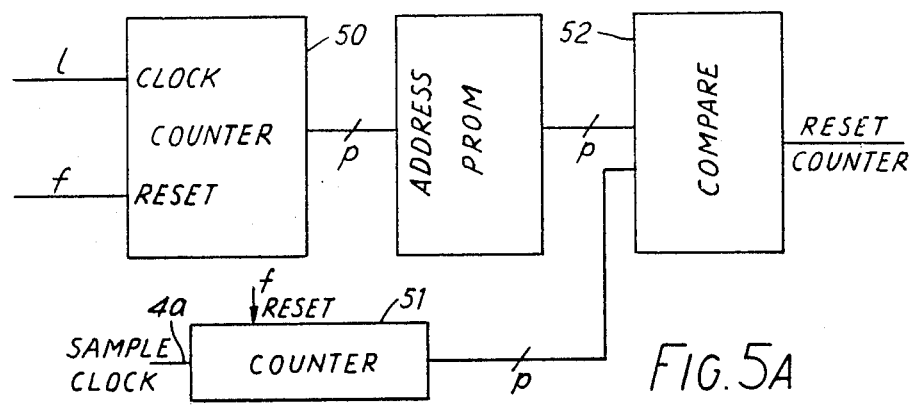

The optical system 1, detection and processing device 2, analogue to digital converter 3, sample clock 4 and sync. separator 5, may be conventional and thus need not be described in detail herein.

DIGITAL FILTER (FIG. 4)

The digital filter determines whether a sample is much greater or much less than its neighbours on the same TV line and, if so, replaces that sample by its preceding sample. If not that sample is fed to the output of the filter.

The filter comprises an input 40 for receiving an n bit sample, and a series arrangement of two data latches 41 and 42 clocked at clock inputs CK by the clock pulses on line 4a. In this way three samples A, B and C can be present at the input of the filter and at the outputs of the latches simultaneously. A first comparator 43 determines whether sample B exceeds sample A or vice versa by more than a preset amount, and a second comparator 44 determines whether sample B exceeds sample C or vice versa by more than the preset amount.

A logic circuit 45, comprising NAND gates connected to implement the logic function S shown in FIG. 4, controls a data selector 46. The selector 46 has an input Y connected to the output of latch 41 to receive sample B and an input X connected to the output of latch 42 to receive sample C. If B is much greater or much less than both its neighbours A and C and is thus corrupted by noise, logic function S is true (logic '1') and the selector 46 couples the output 47 of the circuit to input X whereby sample B is replaced by its preceding sample C. Otherwise, the output 47 is coupled to input Y and sample B passes to the output.

This filter provides filtering in the line direction only. Filtering in the field direction may also be provided by a further circuit similar to that shown in FIG. 4, the data latches being replaced by delays each giving a delay of one line period.

RANDOM SAMPLE TIME CIRCUIT (FIG. 5)

This circuit comprises a programmable read only memory PROM which contains preset random addresses of sets, each containing sixteen samples, occurring in the central third B of the TV field (See FIG. 2). There is one set on each line in the portion B, the sets occurring at random positions on the lines.

A counter 50, which is reset once per TV field by a field pulse from the sync. separator 5, counts line pulses from the separator 5. The count of the counter 50 addresses the PROM which outputs the stored addresses of the sets. A further counter 51, which is also reset once per field, counts the clock pulses on line 4a, which indicate the timings of the samples, the count indicating the position, or address, of a sample in the image. A comparator 52 compares the address produced by the PROM with the count of the counter 51 and produces a short output pulse (hereinafter referred to as a 'reset pulse') when the address and count coincide. (It is considered unnecessary to describe the control logic for the PROM, such logic being known to those skilled in the art)

RANDOM SAMPLE SELECTION CIRCUIT (FIG. 5B)

This circuit responds to the reset pulse produced by comparator 52 to select 16 successive samples. It comprises a 4 bit binary counter 53 which is reset to contain all zeros by the reset pulse. The counter receives clock pulses from line 4a via and AND gate 54 which it counts until an overflow pulse is produced which inhibits the gate 54 via an inverter 55. Whilst the AND gate is open, the clock pulses also pass to a latch 56 which responds to the clock pulses to successively receive and output sixteen samples. The clock pulses occur on a random sample clock line 4b.

CIRCUIT FOR FORMING A HISTOGRAM (FIGS. 6 AND 7)

EDGE VALUE FORMATION (FIG. 6)

Figure 5B:
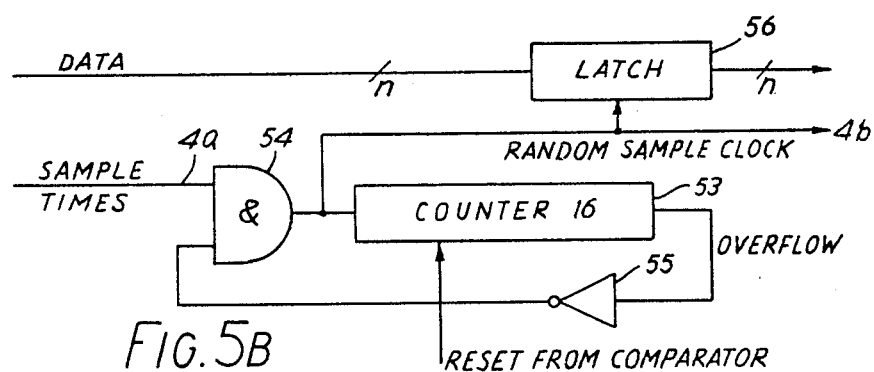
Figure 6:
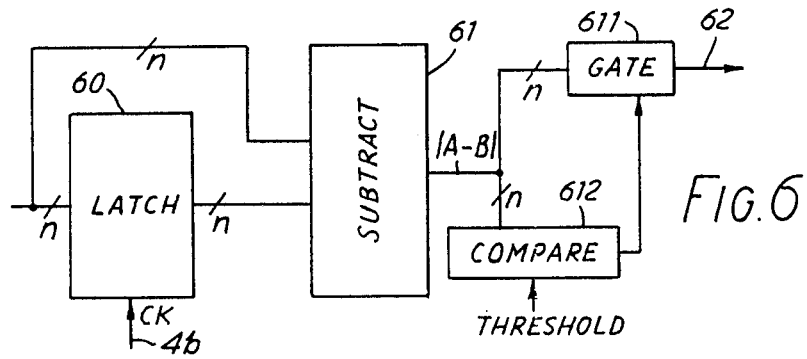

Referring to FIG. 6, the samples selected by the selection circuit of FIG. 5B are fed to a latch 60 which is clocked by the clock pulses on the random sample clock line 4b. A subtractor 61 forms the modulus of the difference between successive pulses by operating on the input and output of the latch 60. This difference represents an edge value. As the values associated with high threshold are most sensitive to changes in focus and to reduce the amount of circuitry, values exceeding a threshold are selected. This is done by comparing the output of subtractor 61 with the threshold in a comparator 612 and opening a gate 611 in response to the comparison. Values exceeding the threshold pass to an output 62.

HISTOGRAM FORMATION (FIG. 7)

Figure 7:
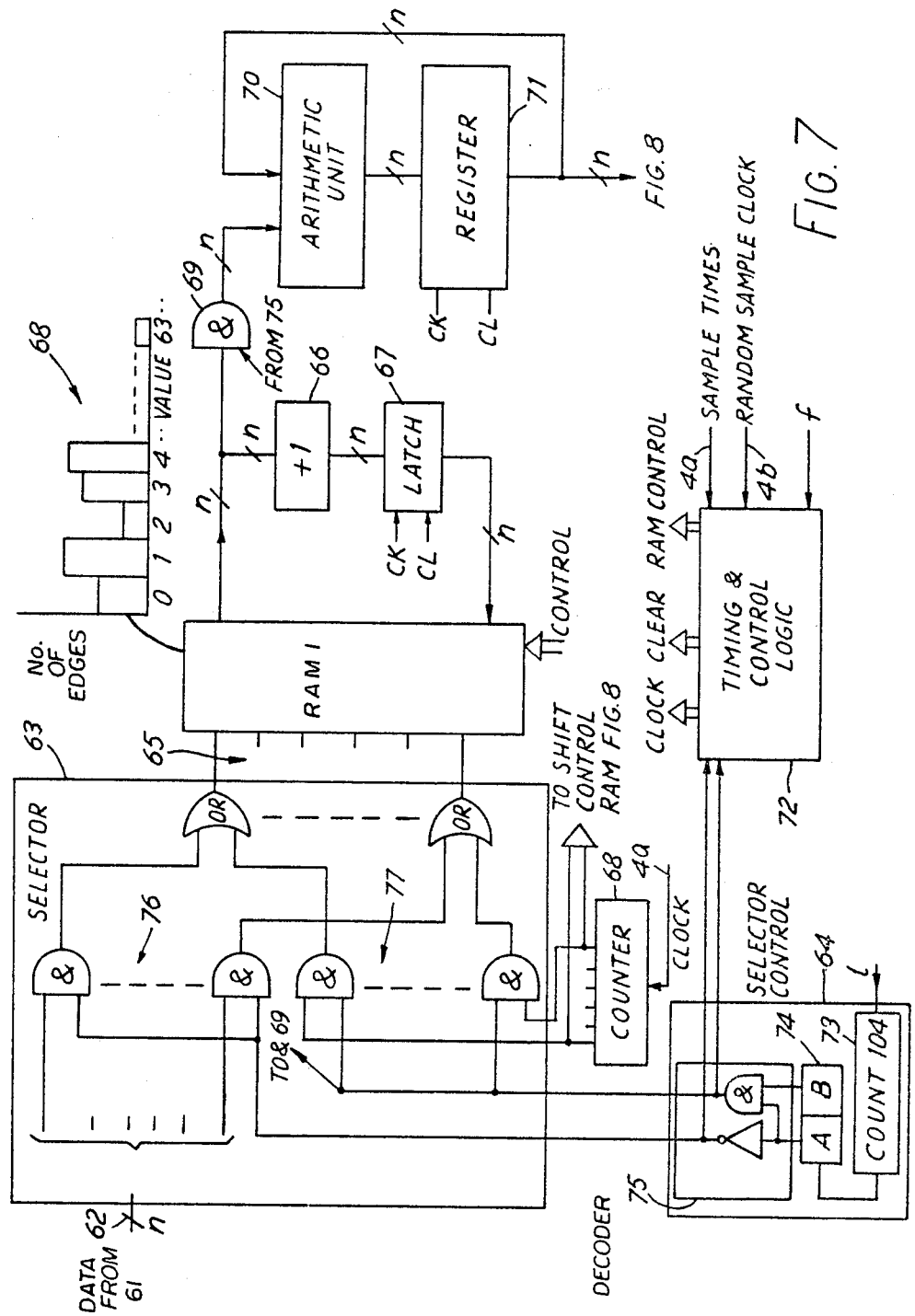

The edge values are produced when the middle third B of the field is being scanned and they are fed from the subtractor 61 to an input 62 of a selector circuit 63 which is controlled by a selector control 64 to pass them during that period to an address input 65 of a random-access-memory RAM 1, controlled by timing and control logic 72. The edge values act as addresses which address respective storage locations. Initially, all the locations contain zeros, but each time a location is addressed its content is read out to an adder 66 where the content is increased by one, and then the incremented content is fed to a latch 67 and written back into the same location. In this way the RAM 1 contains a histogram at the end of the scanning of the central third B (FIG. 2) of the TV field. The histogram represents the numbers of edges having respective values, the values being indicated by the addressed of the locations in which the numbers are stored. Such a histogram is shown schematically at 68 in FIG. 7.

Such histogram must be converted into the desired histogram, shown in FIG. 3, which indicates the numbers of edge values exceeding various thresholds to to tm. In order to do this the storage locations are successively addressed and read out during the bottom third C (FIG. 2) of the scanning of the scene, beginning with the location associated with the highest edge value, and the contents of the addresses successively added together.

For this purpose, the address input 65 of the RAM 1 is connected by the selector circuit 63 under the control of the selector control 64 to a down-counter 68 which is preset to count down from the address of the location of highest value in response to clock pulses derived, for instance, from line 4a.

The content of each location is fed via an AND gate arrangement 69 to an arithmetic unit 70 where it is added to the sum of the contents of the previously addressed locations, that sum being stored in a register 71. Thus the register 71 successively outputs the numbers of edges associated with the respective thresholds to to tm of the histogram of FIG. 3, beginning with the number associated with tm; (i.e. more colloquially, it sequentially outputs the vertical bars of the histogram of FIG. 3 in an order beginning with the bar associated with the highest threshold).

SELECTOR, SELECTOR CONTROL AND TIMING AND CONTROL LOGIC

The selector control 64 comprises a counter 73 arranged to count 104 line pulses (i.e. one-third of one field of the TV frame) and a counter 74 which counts the overflow pulses of the counter 73. The counter 74 is arranged to successively contain in its storage locations A and B binary codes 10; 01; 11 indicating in FIG. 2 the top A, middle B and bottom C respectively of the field. A decoder 75 decodes the counts in the counter 74 to control the selector and provide timing information to the timing and control logic. The decoder 75 comprises an inverter connected to location A to enable a set of AND gates 76 in the selector to pass the samples from the subtractor to the RAM 1 during the center third B of the TV field and disable them at other times. The decoder 75 also comprises an AND gate connected to both locations A and B to enable a further set of AND gates 77 in the selector to pass the count of the counter 68 to the RAM 1 during the bottom third C of the TV field and disable them at other times.

The AND gate of the decoder 75 also enables the gates 69 at the same time as the gates 77.

The timing and control logic 72 also receives the outputs of the inverter and AND gate of the decoder 75 together with field pulses from the sync. separator and clock pulses. The logic 72 responds to such timing information to control RAM 1 so that during the middle third B of the TV field the RAM 1 reads out the contents of each location addressed by an edge value, writes the incremented content back into the same location, and clears latch 67, and during the bottom third C reads out the contents in response to the counter 68. The logic 72 also ensures that the RAM 1 and register 71 are cleared at the end of each field. The precise form of such logic 72 will be apparent to those skilled in the art.

CIRCUIT FOR FORMING THE FOCUS MEASURE (FIG. 8)

This circuit successively receives from the histogram forming circuit (FIG. 7) n bit words representing numbers $P_{tm}$ of edge values exceeding the thresholds to to tm beginning with the words associated with tm and forms, from the words, the focus measure $$F = \sum_{m=0}^{m} P_{tm} K^m$$

where, in this example, K=2.

As the n bit words are binary representations of the numbers Ptm and K=2, the multiplication of $P_{tm}$ with $2^m$ can be performed by shifting each word m places and the sum can be performed by successively adding the shifted products.

Thus the circuit comprises a shifter 80 followed by an arithmetic unit 81 and a register 82. The unit 81 adds the output of the shifter to the sum of the previously shifted words held in the register 82.

The shifts applied to the word in the shifter are defined by code words stored in a shift factor control random access memory RAM 2. The RAM 2 is addressed by addresses derived from the couunter 68 of FIG. 7. The counter 68 of FIG. 7 causes the n bit words to be fed to the shifter 80 in a preset order of thresholds tm to to and so each address it produces is also a representation of the shift factor m.

The output of the register 82 also feeds a gate 83 which inhibits the output reaching a digital to analogue converter 84 until the sum representing the focus measure F is completed. Conveniently, the gate may be allowed to pass the measure F to the converter 84 at the end of each field, the gate opening in response to the field pulse f.

SERVO MECHANISM (FIG. 9)

Figure 8:
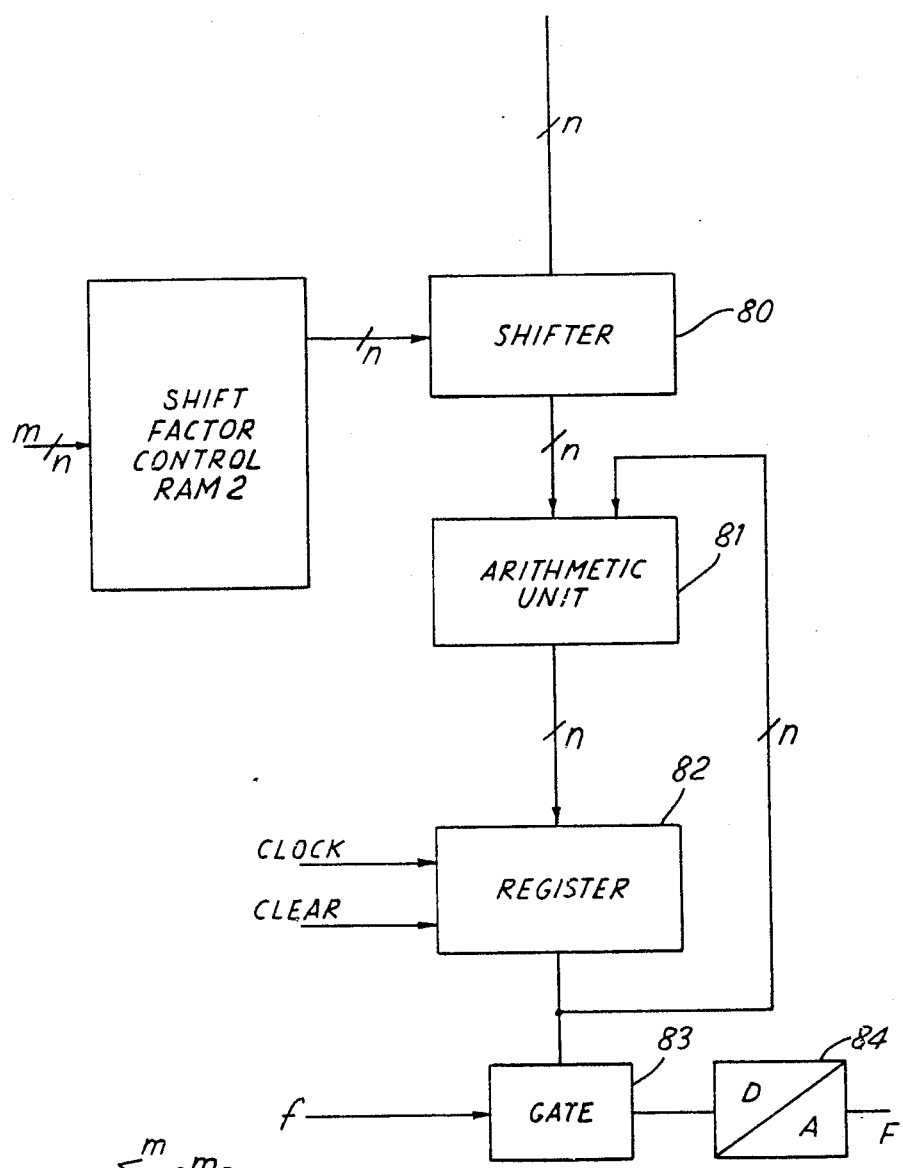
Figure 9:
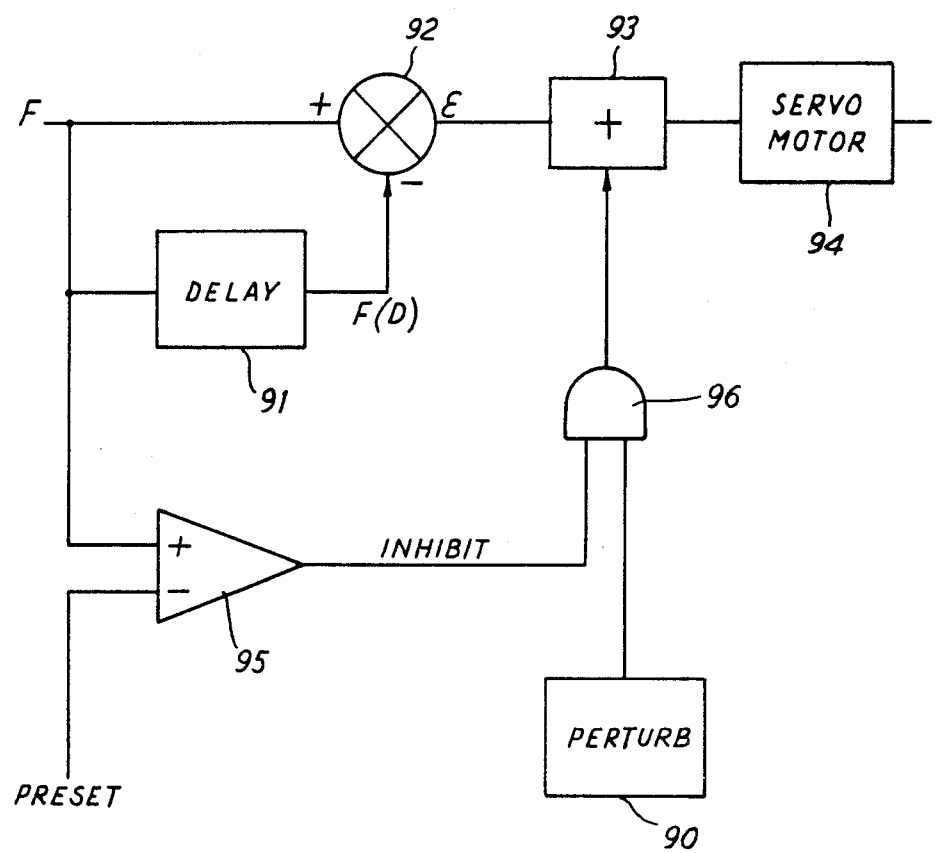

The measure F produced by the circuit of FIG. 8 indicates only the degree of focus but not the direction in which the focus must be moved to optimise it. Thus the servo comprises a signal source 90 to produce a slow perturbation of the focus by an amount which is not appreciable to the eye but which is nevertheless measurable by F.

The current value of F is fed directly and via a delay 91 to a subtractor 92 to produce an error signal ε which is added in an adder 93 to the perturbation. The error ε represents the change in focus (partly due to the perturbation) over a period of time defined by the delay 91. The delay and period of the perturbation are chosen so that the error signal is produced in the correct phase relationship with the perturbation to oppose adverse focus movements. (This assumes that any change of focus other than that due to the perturbation takes place over a time which is long compared to the delay and to the period of one cycle of the perturbation). The error signal $\epsilon$ and the perturbation are added together in the adder 93 and applied to a servo motor 94 which is mechanically coupled to the optical system to vary its focus.

In some circumstances, the content of the scene may not give a workable value of F. For example fog tends to make the scene have an uniform intensity. Thus the mechanism may be provided with a comparator 95 and a gate 96 to inhibit the perturbation if F does not exceed a threshold.

In the above described example of the invention, edge values are obtained by forming the modulus of the difference between adjacent samples of an image, the samples being taken at random. Furthermore, the measure of focus is determined only from values exceeding a threshold, by constructing a histogram of edge values. The measure is determined from the histogram using a function which gives greater weight to edges of higher value. In the example, the weighting function is an empirical function operating on powers of 2 to minimise the logic circuits required. Finally, in order to determine the direction in which the focus needs to be adjusted, a perturbation is added to the focus.

Various modifications could be made as follows:

The measure of focus could be derived from all the edge values, but more circuitry would be required.

Instead of using the weighting function described above, a different function would be used.

For instance the edge values could be weighted by weights inversely proportional to the variance of each edge value. Again, such weighting would increase the circuitry required. It will be understood that references in the specification to optical radiation are intended to embrace visible, infra-red and ultraviolet parts of the electromagnetic spectrum.

What we claim is:

1. A focussing system for an optical system comprising:
    detector means capable of generating an electrical signal representing intensity of electromagnetic radiation prevailing in the image plane of said system,
    a processing means for deriving from said electrical signal further electrical signals representing differences of intensity between respective neighbouring locations in the image plane,
    further processing means comprising means capable of evaluating the number of said further electrical signals representing differences of intensity exceeding each of a plurality of different, fixed threshold values, and means for weighting each said number by a respective amount and for summing the weighted numbers thereby to generate a control signal representing the focus of the image,
    and drive means, responsive to said control signal, to vary the focus of said optical system.

2. A focussing system according to claim 1 wherein the control signal is derived in accordance with the relationship $$F = \sum_{m=0}^{m} P_{tm} K^m$$

where F is the control signal, $P_{tm}$ is the number of said further signals representing differences of intensity exceeding a threshold value tm and K is a constant integer.

3. A focussing system according to claim 1 or claim 2 wherein the detector means comprises means for scanning the image plane, in accordance with a prearranged format, to produce said electrical signal representing the intensity of electromagnetic radiation in successively scanned locations in the image plane, and the processing means comprises storage means containing information relating to the positions of said neighbouring locations in the scanned image plane, and sampling means, responsive to said information, to access to the further processing means those portions of the said electrical signal representing the neighbouring locations.

4. An imaging system according to claim 3 wherein the scanning means is arranged to scan the image plane in accordance with a raster format and wherein at least one pair of neighbouring locations is contained within each of a plurality of successive scan lines.

5. An imaging apparatus according to claim 4 wherein the plurality of successive scan lines constitutes a central portion of the scanned image plane.

6. An imaging apparatus according to claim 3 including filter means comprising comparison means capable of comparing each successive part of the said electrical signal, corresponding to each successive location in the scanned image plane, with the immediately preceding and succeeding parts corresponding to the immediately preceding and succeeding locations, and means for replacing the preceeding part of the signal with either of the other said parts whenever the magnitude of the preceeding part is significantly different for both of the other parts.

7. An imaging apparatus according to any one of claim 1 or claim 2 including means for perturbing the focus, means for comparing control signals generated both at the time of the perturbation and after a predetermined delay so as to be capable of generating a difference signal, and means responsive to a difference signal to vary the focus in a sense appropriate to reduce the difference signal.

8. An imaging apparatus according to claim 1 or claim 2 responsive to infra-red radiation.

9. An imaging apparatus according to claim 1 or claim 2 responsive to ultra violet radiation.

* * * * *